June 23, 1953  J. T. MARVIN  2,642,624
MOLD FOR FOAMED LATEX
Filed April 18, 1950  2 Sheets-Sheet 1

INVENTOR
JOHN T. MARVIN
BY
HIS ATTORNEYS

June 23, 1953 J. T. MARVIN 2,642,624
MOLD FOR FOAMED LATEX
Filed April 18, 1950 2 Sheets-Sheet 2

INVENTOR.
JOHN T. MARVIN
BY
HIS ATTORNEYS

Patented June 23, 1953

2,642,624

UNITED STATES PATENT OFFICE 2,642,624

MOLD FOR FOAMED LATEX

John T. Marvin, Dayton, Ohio, assignor to General Motors Corporation, Detroit, Mich., a corporation of Delaware Application April 18, 1950, Serial No. 156,677

1 Claim. (Cl. 18—39)

This invention relates to molds for foamed latices and the like.

It is, therefore, a basic object of the invention to provide a mold in which articles may be formed from foamed latex, which mold provides heat passages within the foamed latex and wherein the article molded has a relatively constant area throughout any planar cross section thereof.

In carrying out the above object, it is a further object to provide a mold for molding foamed latex which includes a body portion and cover portion, each portions of which having inwardly extending, conically shaped, hollow protuberances nesting in uniformly spaced relation when the mold is closed.

Another object of the invention is to provide a mold for molding an article made of foamed rubberlike material which is of a substantially uniform area throughout any planar cross section thereof and which has less side sway and resilient displacement than articles made in conventional types of molds.

Further objects and advantages of the present invention will be apparent from the following description, reference being had to the accompanying drawings, wherein preferred embodiments of the present invention are clearly shown.

In the manufacture of foamed rubberlike articles, such as foamed rubber seat cushions, mattresses, and the like, it is necessary in the curing of the foam to maintain a relatively thin cross section in all portions of the foamed latex within the mold. This is necessary to assure uniform heating during the curving of the latex compound.

Figure 3:
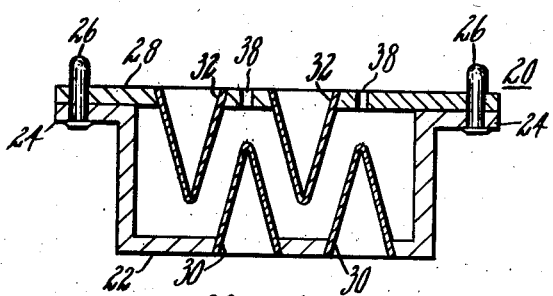
Fig. 3 is a cross section of a mold, showing relationship between the cores carried by the cover and those carried in the base section of the mold.

In practice, tubular protuberances or cores are used on the base of the mold which extend therefrom and in the foamed latex, which tubular protuberances carry steam or other heating medium into close contact with the mass of foamed latex being cured. In this manner, there is no portion of the foamed latex within the mold which has a thickness greater than can be easily cured within a relatively short period of time, for example, 10 to 30 minutes as the case may be in accordance with the specific compound being curved. Cushions made in this manner are quite satisfactory in resilience and use when being compressed in a direction parallel to the axis of the tubular depressions in the cushion. However, in an automobile seat cushion, for example, considerable side sway is apparent during use wherein the top portion of the cushion which has no cored out sections therein tends to have less side sway than the bottom of the cushion which includes the cored portions. In order to obviate this difficulty and also to provide more uniform curing, faster heat distribution, less rubber per unit volume, etc., the present invention is directed to a mold as shown in Fig. 3 at 20. The mold consists of a main body portion 22 which is, in effect, a box having ears 24 thereon which include upwardly extending dowel pins 26. A cover 28 is provided which has apertures therethrough which register with the dowel pins 26 so that the cover may be positively positioned with respect to the base portion 22.

Figure 1:
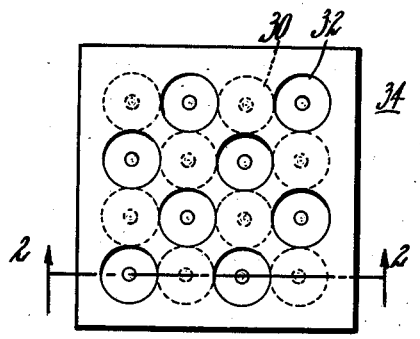
Fig. 1 is a plan view of a rubberlike article showing the inwardly extending cored portions in solid lines, with dotted lines indicating the placement of cored portions extending from the other side thereof.
Figure 2:
Fig. 2 is a cross section through the rubberlike article taken on line 2—2 of Fig. 1.

In order to get proper heat distribution within the foamed latex, a plurality of evenly spaced upwardly extending hollow tubular protuberances 30 are provided in the body portion of the mold. The cover portion 28 is likewise provided with conically shaped hollow protuberances 32 which are properly spaced as shown in connection with the rubberlike article shown in Fig. 1, so as to interspace between the protuberances 30 in the base portion. These protuberances may be called cores since they actually core out the foamed latex and permit heat to be distributed therethrough. The cores 30 and 32 may be of any equal number and preferably are so spaced that their base sections will touch when projected into a single plane. In this manner, a satisfactory uniform spacing is maintained between the conical walls of the cores in the cover and base sections as noted in Fig. 3. The article 34 itself, as shown in Figs. 1 and 2 has a reverse configuration of the mold.

In the manufacture of articles in molds, such as disclosed herein, any number of cores may be used, such conically shaped cores preferably have an apex angle of approximately 30°. It is apparent that this angle may vary widely in accordance with the thickness of the cushion being formed. Similarly, according to the specific overall area of the cushion, the number of rows of cores in both the base section and the cover section will vary considerably, the mold shown in the drawings merely being illustrative of one type of the mold.

Figure 4:
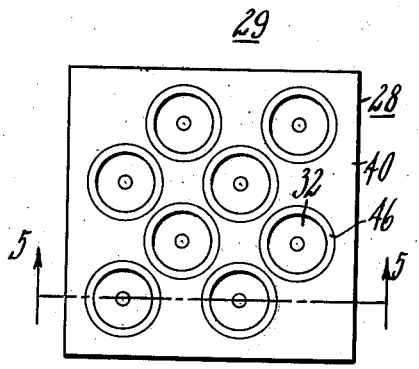
Fig. 4 is a plan view of the top of a mold.
Figure 5:
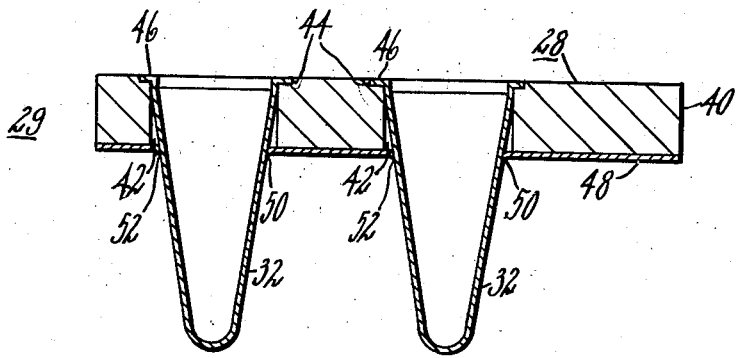
Fig. 5 is a section taken on line 5—5 of Fig. 4, showing the construction used in fabricating the mold.

The mold 29 may be made in a number of ways. One of these is shown in Figs. 4 and 5 wherein the top 28 only of the mold is shown. It is understood that the base 22 may be made in a similar manner, that is to say, the cores may be attached in a similar manner. Referring specifically to Fig. 5, the construction of the top 28 is clearly shown wherein the top 28 comprises a plate 40 having a plurality of apertures 42 therethrough and spaced at proper intervals to accommodate the cores 32. The diameter of holes 42 should be slightly less than the base diameter of the conical cores 32, for example, in the order of three or four thousandths of an inch. Each of the holes 42 preferably include an undercut portion 44 at the outside of the plate 40 and each of the cores 32 preferably include an outturned lip 46 thereon which fits snugly within the undercut 44. Thus when the cores 32 are pressed through the holes 42, the base of the cores are slightly deformed when the flanges 46 bottom in the undercut portion 44 whereby the cores 32 are held firmly in place. In order to assure proper placement of the cores 32 and to prevent any accidental displacement thereof, a locking plate 48 is provided which includes a plurality of apertures 50 therethrough. The apertures 50 are in the same positions relative to the plate 48 as the holes 42 in the plate 40. Thus plate 48 may be superimposed on the plate 40 and holes 50 will line up with the holes 42.

The holes 50 are of a predetermined smaller diameter than the portion of the cores 32 over which they fit. The diameter of the holes should be preferably in the order of three to five thousandths of an inch less than the diameter of the cores 32 at the point where they pass through the plate 40. Thus when the plate 48 is pressed downwardly over the cores 32, the edges of the plate around holes 50 bite into the cores 32 as at 52 and permanently lock the cores in place against any accidental displacement.

It is apparent that the cores may be positioned within the base portion in the mold in a manner as described hereinbefore. It is also apparent that other means of assembling the cores may be utilized, for example, the cores may be welded into the parts of the mold or may be screwed in if threads are provided or, for that matter, may be attached in any suitable manner, the method disclosed herein being a simplified assembly process wherein simple drilling and/or punching operations are all that is required.

In the manufacture of the foamed rubberlike cushion, latex, such as natural rubber latex, butadiene-styrene copolymer latex, butadiene-acrylonitrile copolymer latex, polychloroprene latex, mixtures thereof and, in fact, latices of any of the butalastic polymers which may be gelled and cured, is foamed in the usual manner by beating air therein and compounded suitably so as to be capable of being cured. Into this foam is usually placed a delayed coagulant which will gel the foam in a short period of time after it has been placed in the mold. The base section 22 of the mold is then filled with the latex foam which is scraped off level across the top thereof whereupon the cover 28 is aligned by the dowel pins 26 and pressed into place. In order to accommodate the displaced latex foam, vent holes 38 may be provided in the cover, or during the scraping process, the level of the latex may be scraped to a predetermined level below the top of the base section to compensate for the displacement when the cover is in place. In any event, after the cover is in place, the mold should be full of foamed latex whereupon the latex within a predetermined period gels through the action of the delayed coagulant. The mold with the gelled latex foam therein is next placed in a curing oven or retort and is cured in a suitable length of time whereupon the mold may be disassembled and the cushion removed. It is apparent that a mold lubricant should be used on the mold sections and any of the conventional lubricants are satisfactory for this purpose.

Since the art of foaming, gelling and curing latices forms no part of this invention, it is to be understood that the disclosure here is, in no way, limited to specific latices or compounds, etc.

While the embodiments of the present invention as herein disclosed, constitute preferred forms, it is to be understood that other forms might be adopted.

What is claimed is as follows:

A mold for foamed latex comprising in combination; a base portion and a cover portion therefor, at least one of said portions including a plurality of cores set therein and extending from the outside of said mold portion therethrough, each of said cores including a flange abutting the outside surface of said mold portion for preventing further inward movement thereof with respect to the said mold portion, and an apertured plate positioned at the mold side of said mold portion and firmly pressed against the surface of said mold portion and firmly and simultaneously gripping all said cores for locking the cores in place with respect to said mold portion and for providing the mold surface.

JOHN T. MARVIN.

References Cited in the file of this patent

UNITED STATES PATENTS

| Number | Name | Date |
|---|---|---|
| 1,522,969 | Morand | Jan. 13, 1925 |
| 2,351,529 | Luxenberger et al. | June 13, 1944 |
| 2,359,003 | Sawyer | Sept. 26, 1944 |
| 2,364,036 | MacKay et al. | Nov. 28, 1944 |
| 2,371,788 | Weeber | Mar. 20, 1945 |
| 2,560,783 | Scott | July 17, 1951 |

FOREIGN PATENTS

| Number | Country | Date |
|---|---|---|
| 15,519 | Great Britain | Oct. 13, 1900 |
| 434,550 | Great Britain | Sept. 4, 1935 |